UNITED STATES PATENT OFFICE.

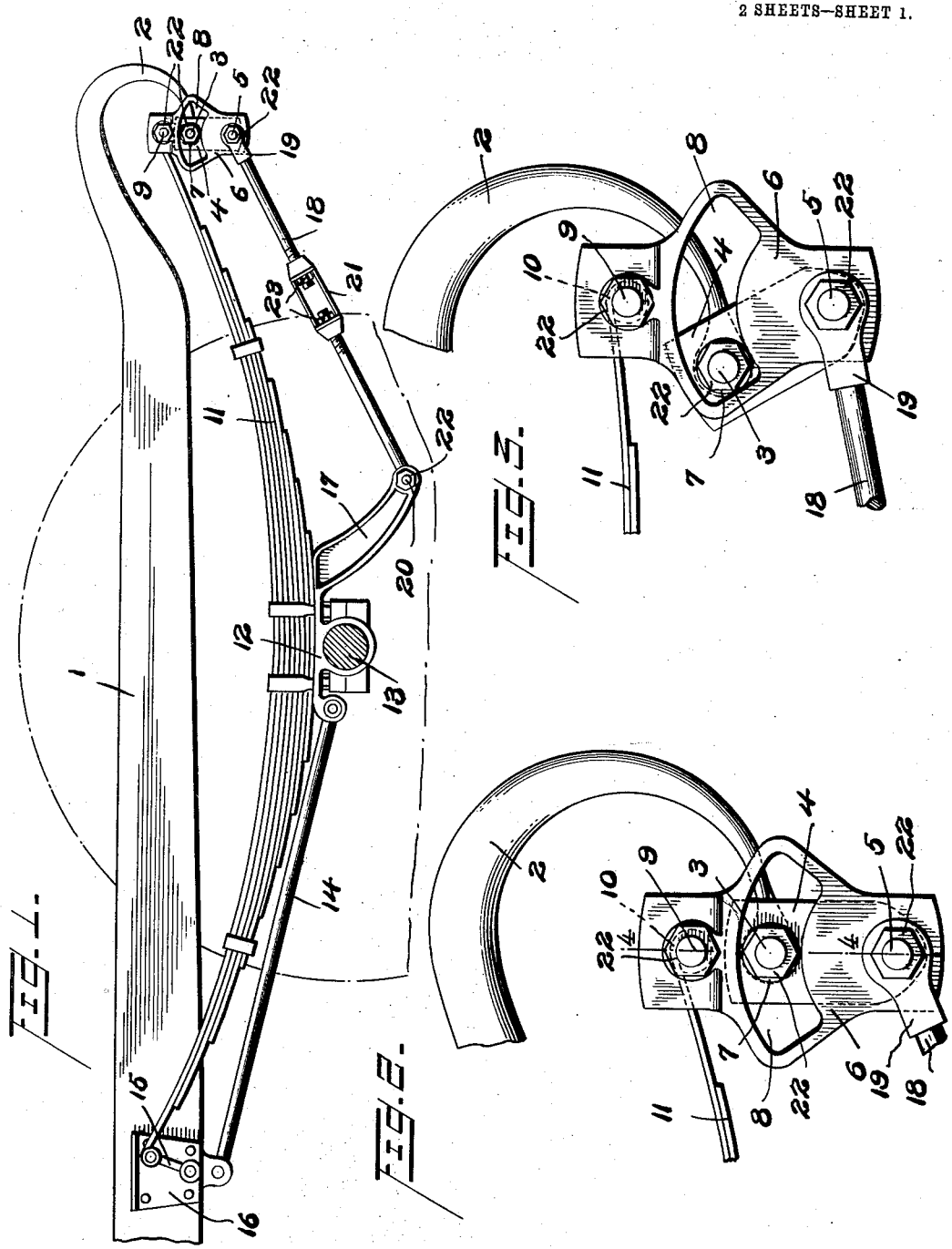

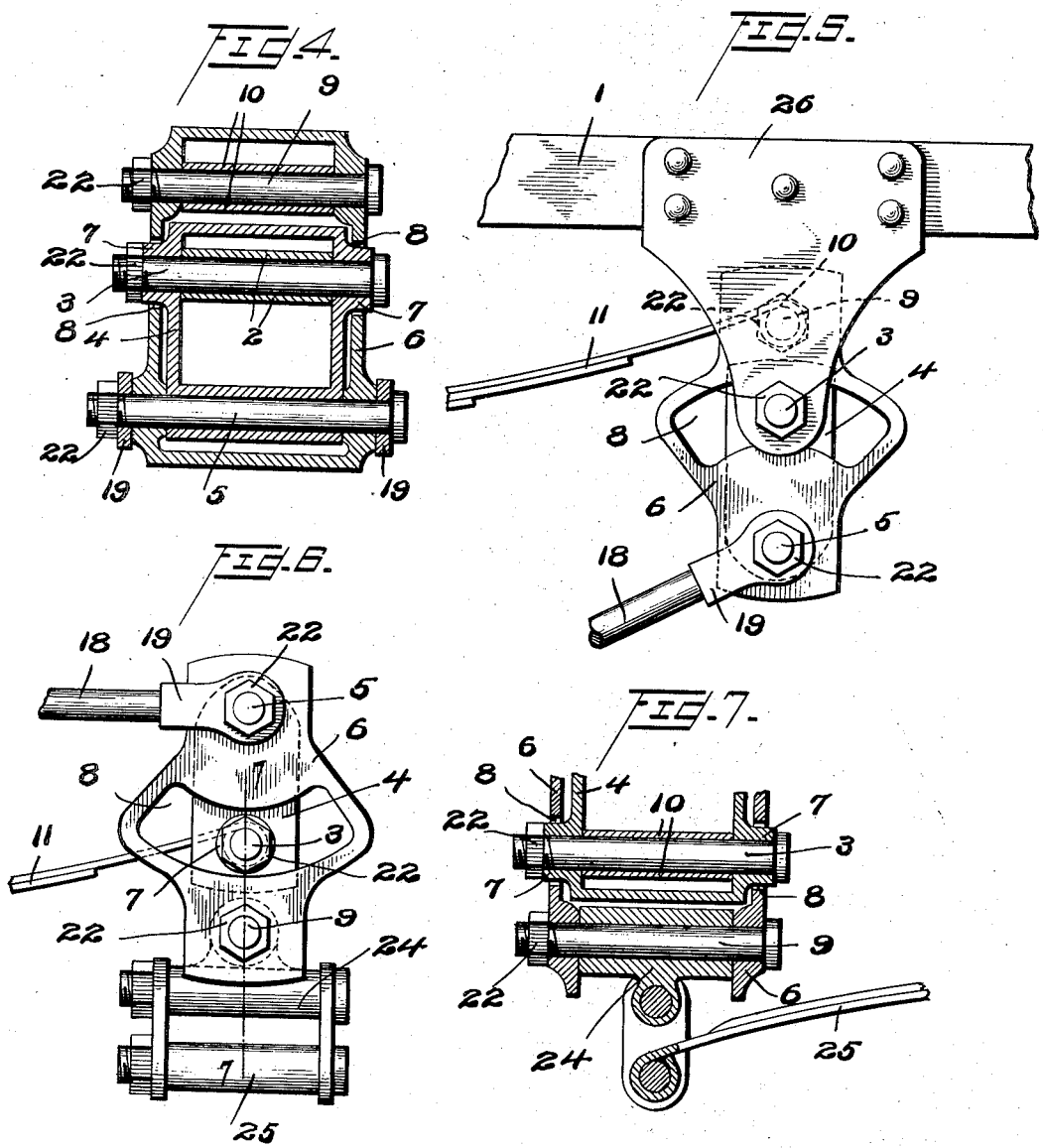

GEORGE LAWSON ROBERTSON, OF PHILADELPHIA, PENNSYLVANIA, ASSIGNOR OF ONE-HALF TO WILLIAM C. O'NEILL, OF PHILADELPHIA, PENNSYLVANIA.

SPRING-EQUILIBRATOR.

1,088,298.  Specification of Letters Patent.  Patented Feb. 24, 1914.

Application filed May 24, 1913. Serial No. 769,559.

*To all whom it may concern:*

Be it known that I, GEORGE L. ROBERTSON, a citizen of the United States, residing at Philadelphia, in the county of Philadelphia and State of Pennsylvania, have invented certain new and useful Improvements in Spring-Equilibrators, of which the following is a specification.

My invention relates to improvements in spring equilibrators, the object of the invention being to provide an improved connection between the spring and the frame which will not only consume jars, shocks, and vibrations, but which will prevent sudden rebound of the spring, and thereby prevent the occurrence of shock and vibration.

A further object is to provide improvements of this character which may be attached in various ways to a vehicle, and which is of extremely simple construction, comparatively cheap to manufacture and install, and which is strong and durable in use.

Vehicle springs have two inherent qualities, namely, flexibility and resiliency which under certain conditions generates in the spring what is known as rebound.

It is the purpose of my improved mechanism to overcome such rebound to a material extent.

The object of my invention is to provide a device that will operate as above described, not to prevent the rebound, but to prevent the cause of the rebound.

With these and other objects in view, the invention consists in certain novel features of construction and combinations and arrangements of parts as will be more fully hereinafter described and pointed out in the claims.

In the accompanying drawings: Figure 1 is a fragmentary view in side elevation illustrating a preferred arrangement of my improvements. Fig. 2 is a view showing the equilibrator on an enlarged scale. Fig. 3 is a view similar to Fig. 2, but showing the device in the position assumed when a jar or drop causes the frame to move downwardly against the action of the spring. Fig. 4 is a view in vertical section on the line 4—4 of Fig. 2. Fig. 5 is a view showing the parts connected by a bracket to the frame. Fig. 6 is a view illustrating a modification, and Fig. 7 is a fragmentary view in vertical section on the line 7—7 of Fig. 6.

1 represents the side bar of the frame or chassis having a downwardly curved arm 2 at its rear end which is pivotally connected by a bolt 3 to a pivoted member 4 which I shall term a link, but which, as a matter of fact, is a casting of general rectangular form as shown in Fig. 4, and at its lower end is pivotally connected by a bolt 5 with a frame 6 between the side members of which latter, the link swings at its upper end. This upper portion of the link 4, where it receives the bolt 3, has enlargements 7 which move through slots 8 in the sides of frame 6. The upper end of frame 6 is connected by a bolt 9 with an eye 10 formed at the free end of a spring 11. This spring 11 is supported upon a bearing 12 on axle 13, and said bearing is connected to the frame 1 by the ordinary radius rod 14.

The forward end of spring 11 is connected by a link 15 with a bracket 16 on the frame 1, but this particular connection of the spring with the frame is, of course, immaterial, and may be varied to suit the trade.

A bracket 17 is fixed to the bearing 12, and is connected by a radius rod 18 with bolt 5. A preferred form of this connection is to provide a fork 19 on the end of rod 18 which straddles frame 6 and receives the bolt 5.

The connection of rod 18 with bracket 17 is pivotal, and is preferably through the medium of a bolt 20, and a turn buckle 21 connects two sections of rod 18, so that the length of this rod may be adjusted to suit conditions.

Jam nuts 23 are provided in the turn buckle to lock the parts against accidental movement. It is, of course, to be understood that the several bolts above referred to are secured in place by ordinary nuts 22 which permits their removal as occasion may require.

Fig. 1 shows the parts in their normal position in which it will be noted that the pivot points 9, 3, and 5 are in vertical alinement. To accomplish this, the turn buckle 21 is adapted to swing the frame 6 until the pivot points are in alinement regardless of the load. When the vehicle strikes a rut or due to some other cause, the frame 1 moves downwardly, the pivot points 9 and 5 will be maintained in vertical alinement or substantially such alinement, and cause the rod 18 and the spring 11 to move downwardly and rearwardly in substantial parallelism. However, these pivot points both move rearwardly with relation to frame 1, while pivot point 3 must always move in the same vertical plane without any rearward or forward movement, so that an extreme position of the parts will be substantially as indicated in Fig. 3. The upward movement of spring 11 returning parts to normal, must bring the pivot points 9 and 5 upwardly and forwardly until the three pivot points 9, 3, and 5 are in alinement. A further upward movement will carry pivot points 9 and 5 forward in advance of pivot point 3, but this tendency is resisted by the toggle lever effect of the link and the frame, so that the rebound is prevented.

In Fig. 5, I illustrate a modification in which I connect the link 4 with a bracket 26 secured to the frame bar 1.

In the modification illustrated in Figs. 6 and 7, the construction is like that above illustrated in the other figures of the drawing with the exception that frame 6 and link 4 are in reverse position or upside down. The radius rod 18 is above spring 11, and the lower end of frame 6 is connected by a clevis 24 with a transverse spring 25 such as commonly used on automobiles. The action of the parts in resisting rebound is precisely the same as above described, except that the spring 11 is connected to bolt 3, and thereby directly to links 4, so that when frame 6 is drawn downwardly, pivot 3 will be compelled to swing out of alinement with pivots 5 and 9, as will be readily understood.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a spring and a pivoted radius rod swinging in substantial parallelism with the spring, means pivotally connecting the free ends of the spring and the radius rod, a member pivotally connected to said means, and a device supported on said member, substantially as described.

2. The combination with a spring and a pivoted radius rod swinging in substantial parallelism with the spring, means spacing the free end of said spring and the free end of said radius rod apart and pivotally connected to both, a link connected to the means at one of said pivot points, and a device supported by said link, substantially as described.

3. The combination with a spring, of a bar constituting a part of a vehicle frame, and a radius rod pivotally connected at one end and swinging in substantial parallelism with the spring, of a frame pivotally connected to the spring and to the radius rod, and a link pivotally connected to the frame and to the said bar, substantially as described.

4. The combination with a spring, of a bar constituting a part of a vehicle frame, and a radius rod pivotally connected at one end and swinging in substantial parallelism with the spring, of a frame pivotally connected to the spring and to the radius rod, a link pivotally connected to the frame and to the said bar, the pivotal connection of the bar and the link located between the pivotal connections of the spring and radius rod with said frame, substantially as described.

5. The combination with a bar constituting a part of a vehicle frame, an axle below the bar, a spring supported on the axle, connected at one end to the bar, a bracket having rigid relationship to the spring, a radius rod pivotally connected to the bracket below the spring, a frame pivotally connected at its upper end to the free end of the spring, and at its lower end to the free end of the radius rod, a link pivotally supported by the frame, and pivotally connected at its free end to the first-mentioned bar, substantially as described.

In testimony whereof I have signed my name to this specification in the presence of two subscribing witnesses.

GEORGE LAWSON ROBERTSON.

Witnesses:
 CHAS. E. POTTS,
 MARY E. DITTUS.